United States Patent [19]

Gercekci

[11] Patent Number: 4,763,296

[45] Date of Patent: Aug. 9, 1988

[54] WATCHDOG TIMER

[75] Inventor: Anil Gercekci, Geneva, Switzerland

[73] Assignee: Motorola, Inc., Schaumburg, Ill.

[21] Appl. No.: 881,550

[22] Filed: Jul. 3, 1986

[30] Foreign Application Priority Data

Jul. 5, 1985 [GB] United Kingdom ............... 8517113

[51] Int. Cl.$^4$ .......................... G06F 9/22; G06F 11/28
[52] U.S. Cl. ........................................ 364/900; 371/62
[58] Field of Search ... 364/200 MS File, 900 MS File; 371/48, 62

[56] References Cited

U.S. PATENT DOCUMENTS

| | | | |
|---|---|---|---|
| 4,099,255 | 7/1978 | Stanley et al. ..................... | 364/200 |
| 4,118,792 | 10/1978 | Struger et al. ..................... | 364/900 |
| 4,263,647 | 4/1981 | Merrell et al. .................... | 371/48 X |
| 4,538,273 | 8/1985 | Lasser ................................ | 371/62 |
| 4,586,179 | 4/1986 | Sirazi et al. ...................... | 371/62 X |
| 4,594,685 | 6/1986 | Owens .............................. | 371/62 X |
| 4,627,060 | 12/1986 | Huang et al. ..................... | 371/62 |

*Primary Examiner*—Thomas M. Heckler
*Attorney, Agent, or Firm*—John A. Fisher; Jeffrey Van Myers; Jonathan P. Meyer

[57] ABSTRACT

A data processor (2) including a watchdog timer (8) comprising: a first memory (4) holding a primary operating routine for cyclic execution during operation of the data processor, an address bus (6) for addressing locations in said first memory means, a timer (10) for continuous operation during operation of the data processor and for effecting a system reset in response to the timer reaching a predetermined value, the primary operating routine including at at least one predetermined location an instruction to reset the timer, whereby in normal operation of the data processor the timer does not reach the predetermined value, wherein the data processor further includes a second memory (12) for holding the address of the location containing the instruction to reset the timer, and a comparator (16) coupled to the address bus and the timer for preventing the timer from being reset in response to an instruction to reset the timer unless the address on the address bus is held in the second memory.

17 Claims, 2 Drawing Sheets

WATCHDOG TIMER

BACKGROUND OF THE INVENTION

1. Field of the Invention

The invention relates to data processors using watchdog timers.

2. Description of the Related Art

A watchdog timer is a timer which is continuously running while the data processor (computer) is operating and which causes a system reset if the timer reaches a predetermined value. In normal use the primary operating routine of the computer is arranged to reset the timer at intervals, so that if the computer is operating satisfactorily the timer never reaches its predetermined value. However, if an error should occur which results in the computer executing an endless sub-loop, the timer is not reset and continues to count to its predetermined value, at which point the endless loop is exited by the system reset.

A known computer system employing a watchdog timer is shown in FIG. 1. The computer is arranged to execute its primary operating routine cyclically and to jump from the primary routine to sub-routines (in order to perform specific tasks) as necessary. The primary routine contains, at predetermined locations, instructions to reset the watchdog timer. The positions within the primary routine of these instructions to reset the watchdog timer are so chosen that in normal operation of the computer the watchdog timer does not reach its predetermined count (and so cause a system reset) between any two consecutive instructions to reset the watchdog timer. Thus, if an error occurs in a sub-routine (e.g. a repetitive call to the sub-routine from within itself), the watchdog timer will not be reset and will reach its predetermined count, so causing a system reset.

Such watchdog timers are well known. However, it is still possible for such a watchdog timer to be "fooled" if, for example, an endless sub-routine (which should cause the timer to reach its predetermined count) also contains an instruction to reset the watchdog timer. In such a case the watchdog timer is continually reset in the endless sub-routine, which carries on executing indefinitely.

SUMMARY OF THE INVENTION

It is an object of this invention to provide a watchdog timer for use in a data processor wherein the above disadvantage may be overcome, or at least alleviated.

In accordance with the invention a data processor including a watchdog timer comprises:

first memory means holding a primary operating routine for cyclic execution during operation of the data processor, an address bus for addressing locations in said first memory means, a timer for continuous operation during operation of the data processor and for effecting a system reset in response to the timer reaching a predetermined value, the primary operating routine including at predetermined locations instructions to reset the timer, whereby in normal operation of the data processor the timer does not reach the predetermined value, characterised in that the data processor further includes second memory means for holding the addresses of the locations containing the instructions to reset the timer, and comparator means coupled to the address bus and the timer for preventing the timer from being reset in response to an instruction to reset the timer unless the address on the address bus is one of the addresses held in the second memory means.

Preferably pointer means are provided for pointing to the address held in the second memory means which is expected to be next encountered and the comparator means is arranged to prevent the timer from being reset in response to an instruction to reset the timer unless the address on the address bus is that pointed to by the pointer means.

DESCRIPTION OF THE PREFERRED EMBODIMENT

Figure 1:
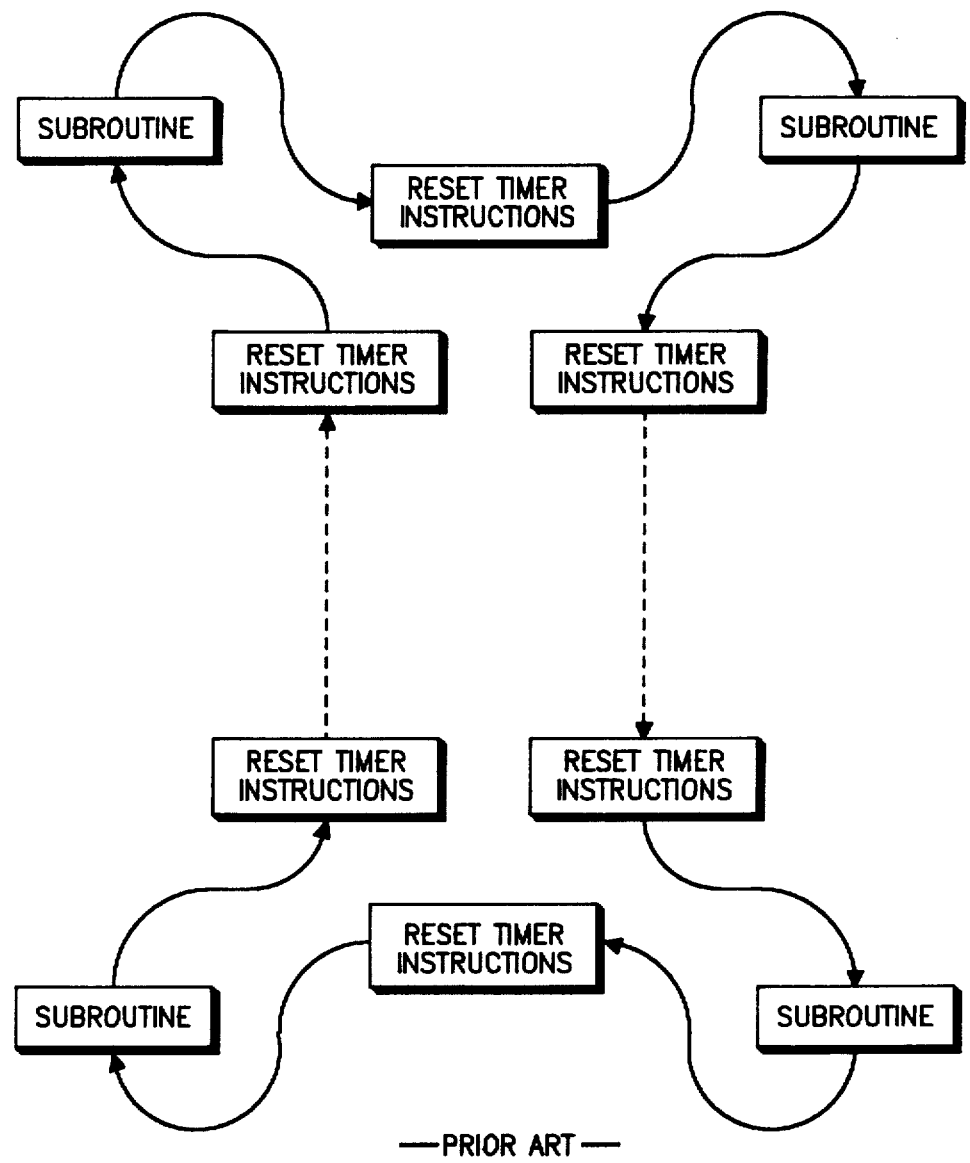
FIG. 1 is a schematic diagram of a known computer system employing a watchdog timer already described above.
Figure 2:
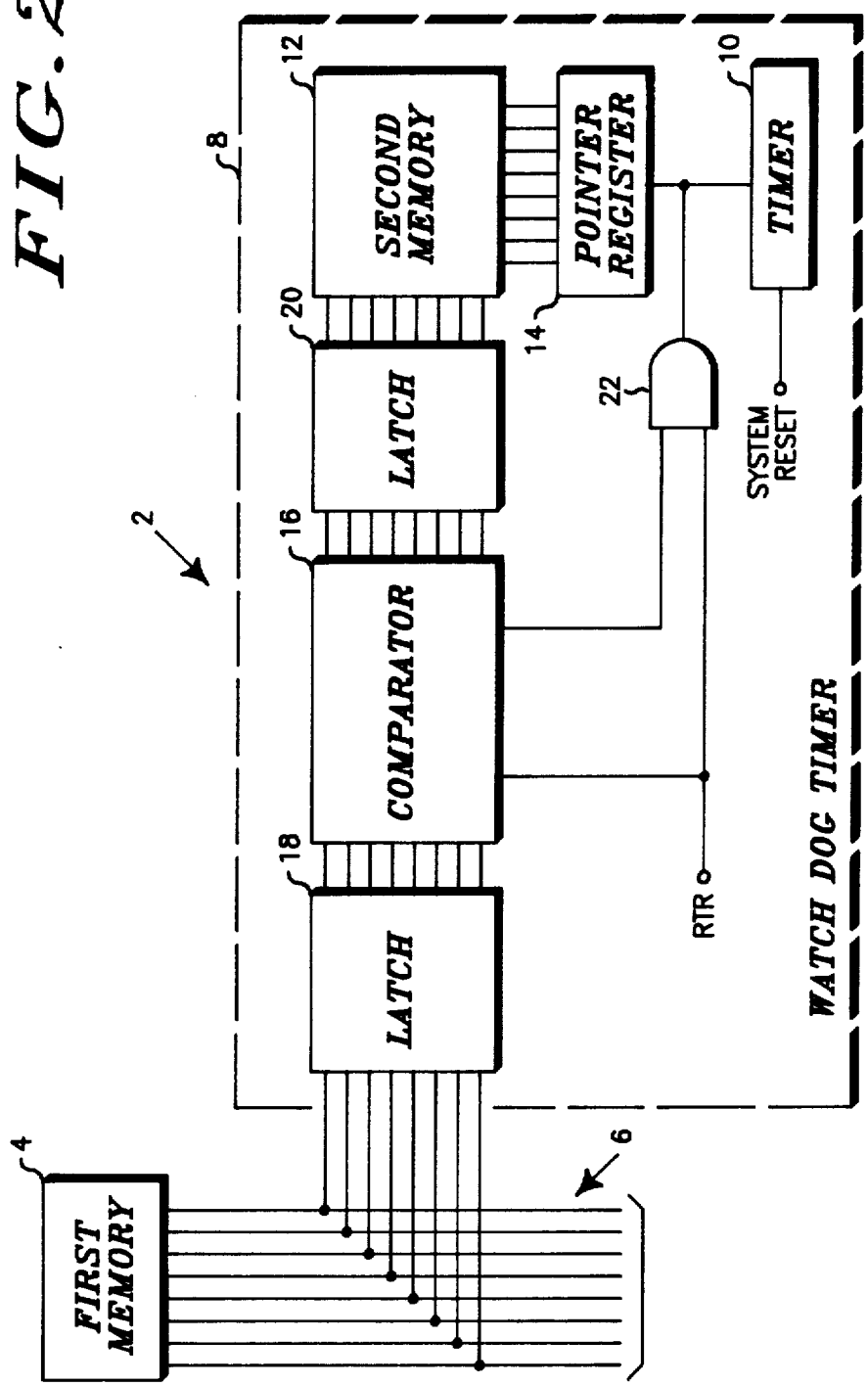
FIG. 2 is a block-schematic diagram of part of a microprocessor employing a watchdog timer in accordance with the invention.

Referring now to FIG. 2, a microprocesser 2 includes a first memory 4 holding the primary operating routine of the microprocessor, an address bus 6 for addressing locations in the first memory 4 and a watchdog timer 8. The operating routine held in the first memory 4 includes, at predetermined locations, instructions to reset a continuously operating timer 10. In this aspect of its function the watchdog timer 8 operates in the conventional manner described above.

In order to prevent false resetting of the timer 10, as will be further explained below, the watchdog timer 8 includes a second memory 12 holding the addresses of the locations in the first memory 4 which contain the instructions to reset the timer 10. The watchdog timer also includes a pointer register 14 associated with the second memory 12. The watchdog timer also includes a comparator 16 having a first input connected via a latch 18 to the address bus 6 and having a second input connected to a latch 20 to the second memory 12. The comparator output is connected to one input of a two-input AND gate 22. The other input of the AND gate is connected to receive a "reset timer request" (RTR) signal produced upon execution of an instruction in the primary operating routine to reset the timer. An enable input of the comparator 16 is also connected to receive the "reset timer request" signal. The AND gate output is connected to the timer 10 and also to the pointer register 14.

In use of the system, immediately following power-on or a system reset the addresses of the instructions to reset the timer in the primary routine in the first memory 4 are read in order from the first memory 4 and written into sequential locations in the second memory 12. The pointer register 14 is set to its starting value (e.g. zero), and the contents of the memory in the location 12 pointed to by the pointer register 14 (i.e. the address in the memory 4 of the first instruction to reset the timer) are loaded into latch 18. The timer 10 is set to its maximum value and begins counting down. As the primary operating routine is executed the addresses on the address bus 6 change, with each new address being loaded into latch 20, until at some point the address on the address bus becomes the address of the first instruction in the memory 4 to reset the timer.

At this point the instruction to reset the timer is executed and a "reset timer request" signal is generated and applied to the input of the AND gate 22. The "reset timer request" signal is also applied to enable the comparator 16. The comparator compares the values held in the latches 18 and 20 and if the values are the same produces an output signal which is applied to the AND gate 22 and causes the AND gate to produce its output signal. The output signal of the AND gate 22 causes the timer 10 to be reset and also causes the pointer register 14 to be incremented. Thus the pointer register now points to the next location in memory 12 which holds the address of the next (i.e. second) instruction in the primary operating routine in memory 4 to reset the timer, and the contents of the newly pointed to location are loaded into latch 20.

Thus, as the primary operating routine continues to be executed the next (second) instruction to reset the timer is reached and a "reset timer request" signal causes the comparator 16 to be enabled and to produce an output signal. The AND gate 22 is thus caused to produce its output signal which resets the timer 10 and increments the pointer register 14, causing the latch 20 to be loaded with the address of the next (third) instruction to reset the timer which will be encountered.

Thus, it will be understood, in normal operation of the microprocessor (i.e. when instructions to reset the timer are only encountered at the next expected address in the primary operating routine) the watchdog timer 8 acts in the same way as known watchdog timers, resetting the timer 10 and preventing the timer from "timing out" and causing a system reset.

If, however, an instruction to reset the timer 10 is encountered (e.g. in a subroutine of an application program which is not fully de-bugged) at an address other than the next expected address (which would have caused a known watchdog timer to be erroneously reset) the following course of action occurs. Execution of the instruction to reset the timer causes a "reset timer request" signal to be applied to the AND gate 22 and causes the comparator 16 to be enabled. Now, however, the comparator produces no output signal because the address held in latch 18 is not the same as the expected address held in latch 20. Thus, the AND gate 22 is prevented from producing its output and the timer 10 is not reset, nor is the pointer incremented.

Thus, the watchdog timer 8 behaves properly and will only reset the timer 10 if the next encountered timer reset instruction is at the next expected address; otherwise timer reset instructions encountered will be ineffective, allowing the timer 10 continue counting down until it "times out" and causes a system reset. In this way, it will be appreciated, the watchdog timer 8 will not be "fooled" by an unexpected reset timer instruction in an infinite loop into resetting the timer and allowing the microprocessor to become "locked" in the infinite loop: the watchdog timer 8 will react as required if such an infinite loop is encountered, causing the timer 10 to "time out" and to generate a system reset.

It will be appreciated that although in the above described watchdog timer only a single comparison occurs when a reset timer instruction is executed, if time is available for a number of comparisons an alternative approach can be adopted where instead of utilising a pointer register 14 and latch 20 a "polling" sequence may be performed each time the comparator is enabled, whereby the address in the latch 18 is compared in turn with each of the addresses held in the second memory and a comparator output signal is produced only if a match is found. This approach would have the advantage of allowing any reset timer instruction in the primary operation routine (and not just the next expected one) to reset the timer, and the "polling" process could be speeded up by always first comparing the address in latch 18 with the next expected address in memory 12.

It will also be appreciated that the watchdog timer 8 may be simplified if the time-out period of the timer 10 is long enough to cover one complete cycle of the primary operating routine. In this case only a single 'reset timer instruction' address in the primary operating routine need be stored in the second memory 12 which may now be a single register. Thus, the pointer register 14 (and possibly also latch 20) may be dispensed with.

It will further be appreciated that in order for the correct address bus value to be compared in comparator 16, the value on the address bus 6 should be conveniently achieved by triggering latch 18 by a signal (not shown) indicative of the microprocessor's instruction fetch cycle.

It will be further appreciated that for extra security the second memory 12 may be a read-write memory which is made read-only (e.g. by disablement of its write enable line in known manner) after completion of its writing sequence following power-on or a system reset, thus preventing its contents from being inadvertently over-written with corrupt data during later operation.

I claim:

1. A data processor including a watchdog timer comprising:
   first memory means holding a primary operating routine for cyclic execution during operation of the data processor,
   an address bus for addressing locations in said first memory means,
   a timer for continuous operation during operation of the data processor and for effecting a system reset in response to the timer reaching a predetermined value,
   the primary operating routine including at at least one predetermined location an instruction to reset the timer, whereby in normal operation of the data processor the timer does not reach the predetermined value,
   wherein the data processor further includes
   second memory means for holding the address of the location containing the instruction to reset the timer, and
   comparator means coupled to the address bus, the second memory means and the timer for comparing the address on the address bus to the address held in the second memory means and for preventing the timer from being reset in response to an instruction to reset the timer unless the address on the address bus is held in the second memory means.

2. A data processor according to claim 1 wherein the second memory means is a read-write memory until it holds the address of the location containing the instruction to reset the timer and thereafter is a read-only memory.

3. A data processor according to claim 2 wherein the comparator means is arranged to compare the address held in the second memory means with the address on the address bus when the data processor is in an instruction fetch cycle.

4. A data processsor according to claim 3 wherein the primary operating routine includes at respective predetermined locations a plurality of instructions to reset the timer and pointer means are provided for pointing to the address held in the second memory means which is expected to be next encountered and the comparator means is arranged to prevent the timer from being reset in response to an instruction to reset the timer unless the address on the address bus is that pointed to by the pointer means.

5. A data processor according to claim 4 wherein the data processor is a microprocessor.

6. A data processor according to claim 3 wherein the data processor is a microprocessor.

7. A data processor according to claim 2 wherein the primary operating routine includes at respective predetermined locations a plurality of instructions to reset the timer and pointer means are provided for pointing to the address held in the second memory means which is expected to be next encountered and the comparator means is arranged to prevent the timer from being reset in response to an instruction to reset the timer unless the address on the address bus is that pointed to by the pointer means.

8. A data processor according to claim 7 wherein the data processor is a microprocessor.

9. A data processor according th claim 2 wherein the data processor is a microprocessor.

10. A data processor according to claim 1 wherein the comparator means is arranged to compare the address held in the second memory means with the address on the address bus when the data processor is in an instruction fetch cycle.

11. A data processor according to claim 10 wherein the primary operating routine includes at respective predetermined locations a plurality of instructions to reset the timer and pointer means are provided for pointing to the address held in the second memory means which is expected to be next encountered and the comparator means is arranged to prevent the timer from being reset in response to an instruction to reset the timer unless the address on the address bus is that pointed to by the pointer means.

12. A data processor according to claim 11 wherein the data processor is a microprocessor.

13. A data processor according to claim 10 wherein the data processor is a microprocessor.

14. A data processor according to claim 1 wherein the primary operating routine includes at respective predetermined locations a plurality of instructions to reset the timer and pointer means are provided for pointing to the address held in the second memory means which is expected to be next encountered and the comparator means is arranged to prevent the timer from being reset in response to an instruction to reset the timer unless the address on the address bus is that pointed to by the pointer means.

15. A data processor according to claim 14 wherein the data processor is a microprocessor.

16. A data processor according to claim 1 wherein the data processor is a microprocessor.

17. A data processor according to claim 16 wherein the data processor is a microprocessor.

* * * * *